April 8, 1958 E. K. KANE 2,830,277
WELDING OF HINGED BUTT JOINT MAGNETIC CORES
Filed June 16, 1953
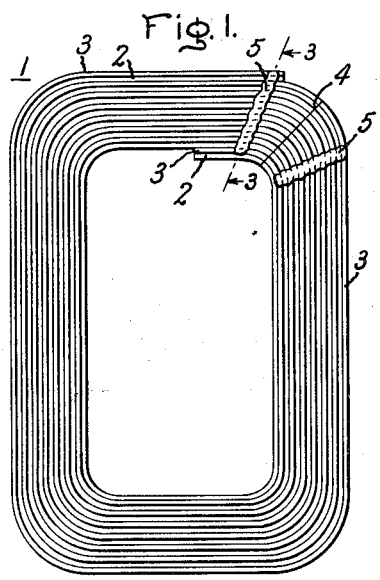
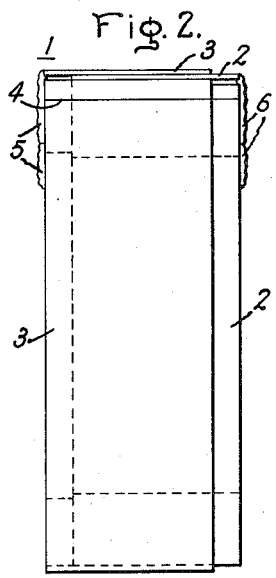
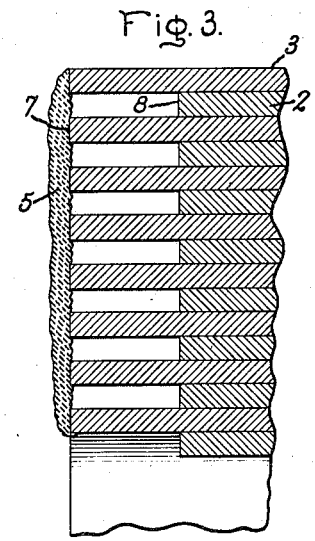
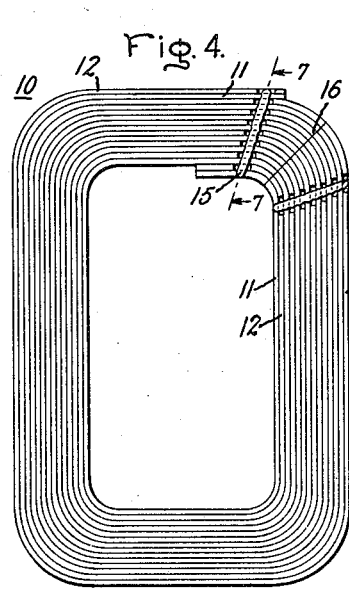
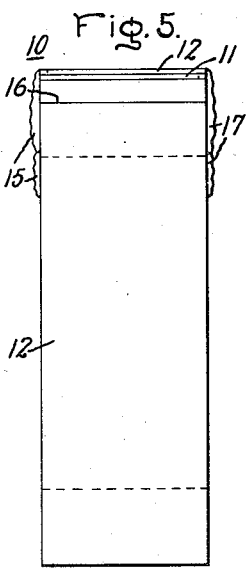
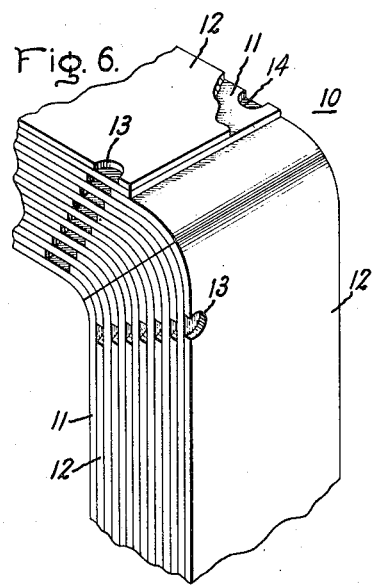
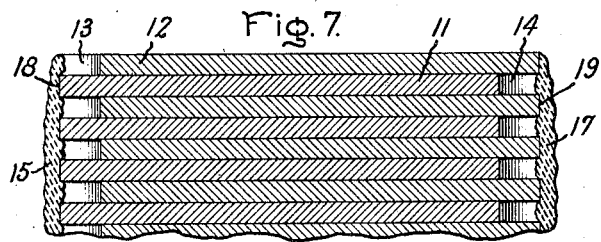
Inventor:
Elias K. Kane,
by Gilbert P. Tarleton
His Attorney.

United States Patent Office 2,830,277
Patented Apr. 8, 1958

2,830,277

WELDING OF HINGED BUTT JOINT MAGNETIC CORES

Elias K. Kane, Pittsfield, Mass., assignor to General Electric Company, a corporation of New York Application June 16, 1953, Serial No. 361,940

7 Claims. (Cl. 336—210)

This invention relates to welding of hinged butt joint magnetic cores, and more particularly, to welding of strip wound laminated hinged butt joint magnetic core sections.

In the construction of strip wound laminated hinged butt joint magnetic core sections, prior to the formation of the butt joint therein, holding means must be employed to hold the various laminations together so that they will not spring apart and become disassembled after the cutting operation. One form of holding means employed has been welds across laminations on only one side of the laminated magnetic core section. Welds have not been employed on both sides of the core section because this causes a short circuit within the core. However, welding on only one side of the core section has a disadvantage in that there is splitting and looseness between the laminations on the unwelded side of the core section.

It is an object of this invention to provide a laminated magnetic core portion wherein both sides of the core portion have a weld across laminations without causing a short circuit condition in said core portion.

It is a further object of this invention to provide a strip wound laminated hinged butt joint magnetic core section wherein both sides of said core section have welds across laminations on opposite sides of said butt joint without causing a short circuit condition in said core section.

My invention comprises a laminated magnetic core portion comprising a plurality of superimposed thin metallic magnetic material laminations, each of said laminations having two side edges each positioned on opposite sides of said core portion, a continuous weld across said laminations on one side of said core portion, said weld interconnecting the side edges on said one side of every other one of said laminations and spaced from the side edges on said one side of laminations alternated with said every other laminations, and a continuous weld across laminations on the other side of said core portion interconnecting the side edges at said other side of said alternated laminations and spaced from the side edges at said other side of said every other laminations.

My invention further comprises a strip wound laminated hinged core section having a butt joint therein, the laminations of said core section each having two side edges positioned on opposite sides of said core section and said laminations being in superimposed relationship, and four welds across said laminations, each of said welds being positioned on an opposite side of said core section and an opposite side of said butt joint adjacent to said butt joint, the welds on one side of said core portion interconnecting the side edges of every other one of said laminations on said one side and spaced from the side edges on said one side of laminations alternated with said every other laminations, and the welds on the other side of said core portion interconnecting the side edges on said other side of said alternated laminations and spaced from the side edges on said other side of said every other laminations.

The invention will be better understood by considering the following description taken in connection with the accompanying drawing, and its scope will be pointed out in the appended claims.

In the drawing, Figure 1 is a front view of a magnetic core section embodying one form of my invention. Figure 2 is a right end view of the core section of Figure 1. Figure 3 is a partial sectional view of my said one form of invention, the section being taken along the line 3—3 of Figure 1. Figure 4 is a front view of a magnetic core section embodying another form of my invention. Figure 5 is a right end view of the core section of Figure 4. Figure 6 is a view in perspective of the butt joint corner core portion of Figure 4 before welds are applied. Figure 7 is a partial sectional view taken along the line 7—7 of Figure 4. Like reference numerals in the various figures will be used to indicate similar parts.

Referring now to the drawing, and most particularly to Figure 1, shown therein is a strip wound laminated hinged butt joint magnetic core section 1. The core section 1 is formed by simultaneously spirally winding two superimposed strips 2 and 3 of thin metallic magnetic material into a closed core section. Each turn of strip 2 is alternated with a turn of strip 3 to give a plurality of superimposed and concentric laminations.

As seen more clearly from Figure 2, the two strips 2 and 3 are offset with respect to each other so that on the left hand side of core 1 the side edges of each turn of strip 3 will extend beyond the side edges of each turn of strip 2 in overhanging relationship. On the right hand side of core 1 the side edges of each turn of strip 2 will extend beyond the side edges of each turn of strip 3 in overhanging relationship.

A butt joint 4 is formed in the core 1 as by cutting across the laminations. However, before cutting, four continuous welds are made across the laminations. Each of the welds is made on opposite sides of the core 1 and opposite sides of the cut 4 adjacent to the cut 4.

Viewing particularly Figure 3, it will be seen that the welds 5 on the left hand side of the core 1 will interconnect and make contact with only the overhanging side edges 7 of each turn or lamination of strip 3. On the left hand side of the core 1 the welds 5 will be spaced from the side edges 8 of each turn or lamination of strip 2. As seen from Figure 2, on the right hand side of the core 1 the welds 6 will interconnect and make contact only with the overhanging side edges of each turn or lamination of strip 2. The welds 6 will be spaced from the right hand side edges of each turn or lamination of strip 3.

Thus, in my invention on one side of the core the welds make electrical contact only with every other lamination, while on the other side of the core the welds make electrical contact only with the laminations not contacted by the welds on said one side. As is well known in the art the strips 2 and 3 may be oxidized or coated with a lacquer or other insulating material so that adjacent laminations are insulated from each other.

Referring now to Figures 4 to 7 for another form of my invention, shown therein is a magnetic core 10 comprising two strips of magnetic material 11 and 12 simultaneously spirally wound into a plurality of superimposed and substantially concentric laminations. During the winding operation or otherwise notches 13 are made in the left hand side edges of each turn or lamination of strip 12, and notches 14 are made in the right hand side edges of each turn or lamination of strip 11.

Welds 15 are applied to the left hand side of the core 10 on opposite sides of a butt joint 16 and welds 17 are applied to the right hand side of the core 10. As shown clearly in Figure 7, the welds 15 on the left hand side of the core 10 will contact only the left hand side edges 18 of every turn or lamination of strip 11. On the right hand side the welds 17 will make electrical contact only with the right hand side edges 19 of each turn or lamination of strip 12. The width dimension of the notches 13 and 14 measured along the notched side edges is greater than the width of opposite portions of the welds 15 and 17 respectively, so that the welds 15 do not come into contact with the left hand edges of strip 12, while the welds 17 do not come into contact with the right hand edges of strip 11.

While there have been shown and described particular embodiments of the invention, it will be obvious to those skilled in the art that changes and modifications may be made without departing from the invention, and that it is intended by the appended claims to cover all such changes and modifications as fall within the true spirit and scope of the invention.

What I claim as new and desire to secure by Letters Patent of the United States is:

1. A laminated magnetic core portion having a plurality of thin metallic laminations in superimposed relationship, each of said laminations electrically insulated from each other and having two side edges positioned on opposite sides of said core portion, a continuous metallic weld extending across laminations on one side of said core portion interconnecting only the side edges on said one side of every other one of said laminations and spaced from the side edges on said one side of the laminations alternated with said every other laminations, portions of said alternated lamination one side side edges adjacent said weld offset with respect to portions of said every other lamination one side side edges adjacent said weld, and a continuous metallic weld extending across laminations on the other side of said core portion interconnecting only the side edges on said other side of said alternated laminations and spaced from the side edges on said other side of said every other laminations, portions of said alternated lamination other side side edges adjacent said second mentioned weld offset with respect to portions of said every other lamination other side side edges adjacent said second mentioned weld.

2. In a laminated magnetic core portion as in claim 1, wherein said every other and alternated laminations have substantially equal widths, the side edges on said one side of said every other laminations extending beyond the side edges on said one side of said alternated laminations in overhanging relationship, and the side edges on said other side of said alternated laminations extending beyond the side edges on said other side of said every other laminations in overhanging relationship, the weld on said one side contacting only the overhanging side edges on said one side, and the weld on said other side contacting only the overhanging side edges on said other side.

3. A strip wound laminated hinged magnetic core section having a butt joint therein, comprising two strips of thin metallic magnetic material superimposed and electrically insulated with respect to each other and simultaneously spirally wound into a closed core section, each turn of one of said strips being alternated with each turn of the other of said strips into a plurality of superimposed and concentric laminations, a cut across laminations in a portion of said core section to form said butt joint, and four continuous metallic welds across laminations, each of said welds positioned on an opposite side of said core section and an opposite side of said cut and adjacent to said cut, the welds on one side of said core section interconnecting only each turn of said one of said strips at the side edges thereof at said one side and spaced from the side edges at said one side of each turn of said other of said strips, portions of said one strip one side side edges adjacent said one side welds offset with respect to portions of said other strip one side side edges adjacent said one side welds, the welds on the other side of said core section interconnecting only each turn of said other of said strips at the side edges thereof at said other side and spaced from the side edges at said other side of each turn of said one strip, portions of said one strip other side side edges adjacent said other side welds offset with respect to portions of said other strip other side side edges adjacent said other side welds.

4. In a core section as in claim 3, wherein said two strips have substantially equal widths and are offset with respect to each other, the side edges at said one side of said one strip extending beyond the side edges at said one side of said other strip in overhanging relationship, and the side edges at said other side of said other strip extending beyond the side edges at said other side of said one strip in overhanging relationship, the welds on said one side contacting only the overhanging side edges at said one side, and the welds on said other side contacting only the overhanging side edges on said other side.

5. In a core section as in claim 3, wherein the side edges at said one side of said other strip have notches therein opposite to the welds on said one side, and the side edges at said other side of said one strip have notches therein opposite to the welds on said other side, said notches extending along said notched side edges beyond the opposite edges of said welds whereby said welds will not contact said notched side edges.

6. A laminated magnetic core portion having a plurality of thin metallic laminations in superposed relationship, each of said laminations being electrically insulated from each other and having two side edges which are positioned on opposite sides of said core portion, a continuous metallic weld extending across laminations on one side of said core portion and interconnecting only the side edges on said one side of every other of said laminations and being spaced from the side edges on said one side of the laminations alternated with said every other laminations, portions of said alternated laminations one side side edges which are adjacent said weld being offset with respect to portions of said every other laminations one side side edges which are adjacent said weld, and a continuous metallic weld extending across laminations on the other side of said core portion interconnecting only the side edges on said other side of said alternated laminations and being spaced from the side edges on said other side of said every other laminations, portions of said alternated laminations other side side edges which are adjacent said second mentioned weld being offset with respect to portions of said every other lamination other side side edges which are adjacent said second mentioned weld.

7. A magnetic core portion comprising a plurality of elongated metallic laminations which are electrically insulated from each other and are stacked in superposed relationship so that opposite side edges of said laminations are positioned on opposite sides of said core portion, means for retaining said laminations with respect to each other comprising a continuous body of metal which extends across laminations on each side of said core portion, the body of metal on one side of said core portion being welded to and contacting only the adjacent side edges of the even numbered laminations and being spaced from the adjacent side edges of the odd numbered laminations, and the body of metal on the other side of said core portion being welded to and contacting only the adjacent side edges of the odd numbered laminations and being spaced from the adjacent side edges of the even numbered laminations and said adjacent side edges of the even and odd numbered laminations on each side of said core portion being offset with respect to each other.

References Cited in the file of this patent

UNITED STATES PATENTS

| | | |
|---|---|---|
| 2,393,439 | White et al. | Jan. 22, 1946 |
| 2,478,029 | Vienneau | Aug. 2, 1949 |
| 2,579,560 | Ford | Dec. 25, 1951 |